McKINLEY JENNINGS.
CORN PLANTER AND FERTILIZER DISTRIBUTER.
APPLICATION FILED DEC. 8, 1917. RENEWED DEC. 12, 1919.
1,342,333. Patented June 1, 1920.
2 SHEETS—SHEET 1.
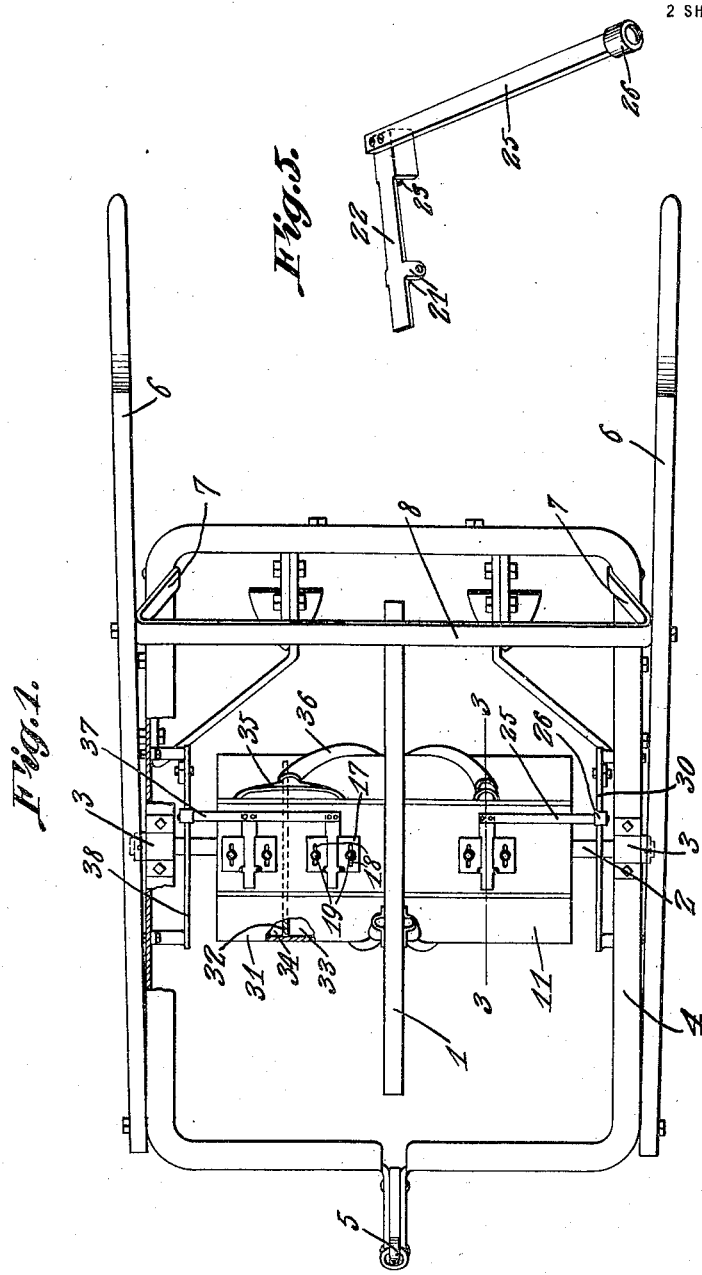
McKinley Jennings, Inventor
Witness
By C. A. Snow & Co.
Attorney

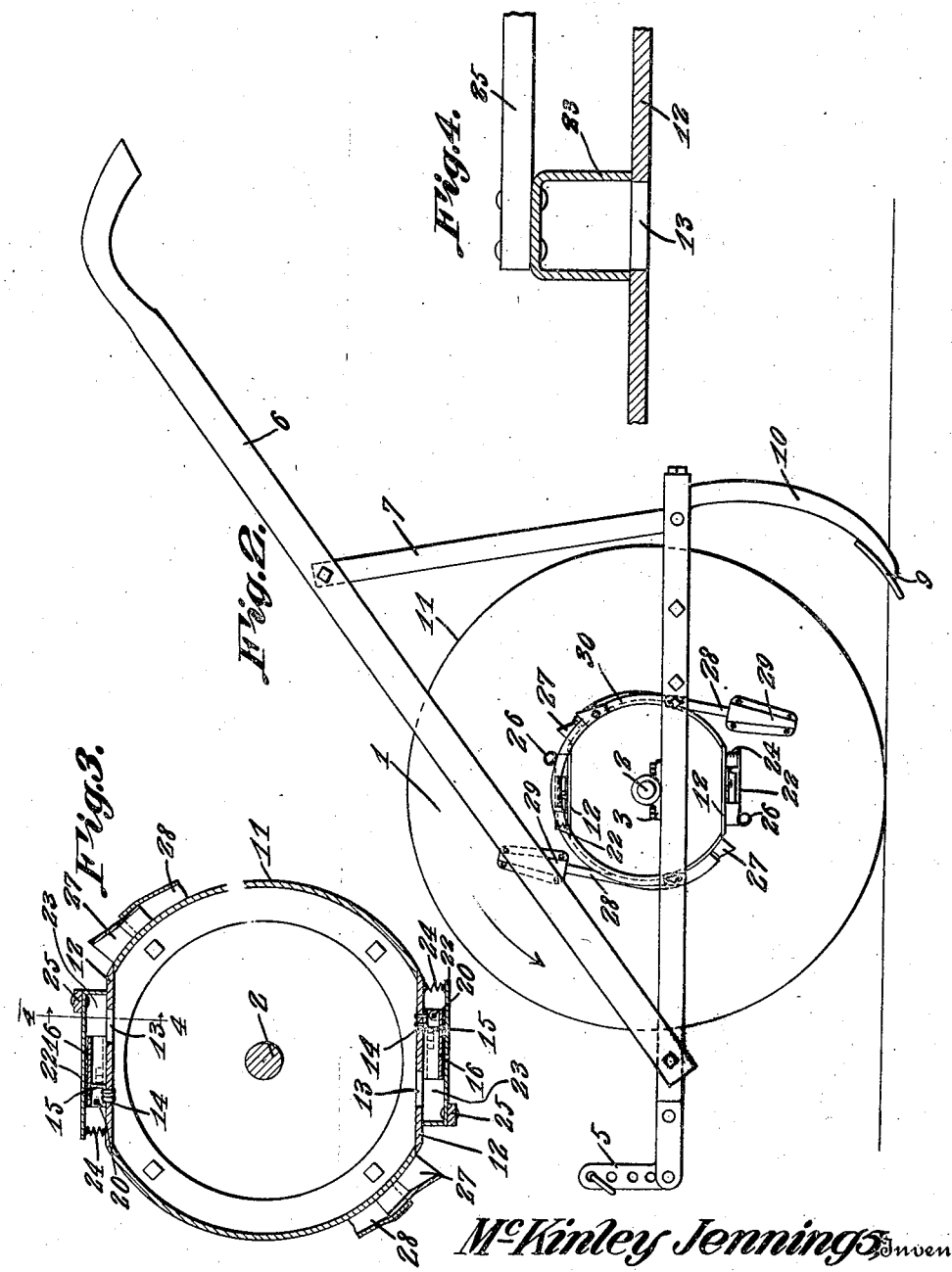

UNITED STATES PATENT OFFICE.

McKINLEY JENNINGS, OF DETROIT, MICHIGAN.

CORN-PLANTER AND FERTILIZER-DISTRIBUTER.

1,342,333.  Specification of Letters Patent.  Patented June 1, 1920.

Application filed December 8, 1917, Serial No. 206,211. Renewed December 12, 1919. Serial No. 344,462.

*To all whom it may concern:*

Be it known that I, McKINLEY JENNINGS, a citizen of the United States, residing at Detroit, in the county of Wayne and State of Michigan, have invented a new and useful Corn-Planter and Fertilizer-Distributer, of which the following is a specification.

This invention relates to planter and fertilizer distributers, one object being to provide a revoluble container movable with a single supporting wheel, said container having novel means for collecting predetermined quantities of seeds or fertilizer and dropping them at regular intervals.

A further object is to provide a dropping mechanism of novel form which can be adjusted readily and which is at all times easily accessible for the purpose of cleaning and repairing the same.

A still further object is to provide a device of this character in which the containers are located at opposite sides of the supporting wheel, it being possible simultaneously to drop corn, beans and fertilizer into a hill from the one machine.

With the foregoing and other objects in view which will appear as the description proceeds the invention resides in the combination and arrangement of parts and in the details of construction hereinafter described and claimed it being understood that changes in the precise embodiment of the invention herein disclosed can be made within the scope of what is claimed, without departing from the spirit of the invention.

In the accompanying drawings the preferred form of the invention has been shown.

In said drawings:—

Figure 1 is a plan view of a planter embodying the present improvements.

Fig. 2 is a side elevation.

Fig. 3 is an enlarged section through one of the containers said section being taken on the line 3—3 Fig. 1.

Fig. 4 is an enlarged section on line 4—4 Fig. 3.

Fig. 5 is a detail view of the lever and pocket of the dropping mechanism.

Referring to the figures by characters of reference 1 designates a supporting wheel having an axle 2 journaled in bearings 3 secured to the sides of the frame 4. This frame may be provided at its front end with a clevis 5 while handles 6 may be extended rearwardly from the sides of the frame, said handles being connected to the rear portions of the frame by braces 7 and being connected together by a cross strap 8. Covering plows 9 are connected to the standards 10 which are secured to the rear portion of the frame, these covering plows being arranged at opposite sides of the rear portion of the wheel 1 so as to cover the seed and fertilizer after they have been deposited in the furrow in which the wheel 1 travels.

Mounted on the axle 2 and secured to the axle and to the wheel 1 is a cylindrical container 11 adapted to hold fertilizer and which container, in the present instance, is provided with diametrically opposed dropping mechanisms. Each dropping mechanism includes a base plate 12 secured to the peripheral portion of the cylinder and constituting a portion of the wall of the cylinder, this plate being provided with an outlet opening 13 extending transversely thereof. Fixedly secured to the plate 12 is a plate 14 having an outstanding stop ear 15 and bridging this ear and plate is an arcuate plate 16 having oppositely extending wings 17 provided with slots 18. Extending into the slots are clamping bolts 19 which project from the plate 12 and by loosening these bolts the wings 17 and the arcuate plate 16 can be adjusted longitudinally to a desired position relative to the opening 13 and then be fixedly secured by tightening the bolts 19.

A pivot pin 20 extends transversely through the arcuate plate 16 and is engaged by ears 21 extending from intermediate points on a lever 22. This lever is provided at one end with a pocket 23 adapted to cover the opening 13 and normally to contact with the plate 12, said pocket being partly closed by the plate 12. A spring 24 is interposed between the other end of the lever and the plate 12 and serves to hold the pocket 23 normally pressed against the plate 12. An arm 25 is fixedly connected to the lever close to the pocket 23 and extends laterally therefrom, there being a roller 26 or the like mounted on the free end portion of this arm.

Attached to the container 11 is a hopper 27 so located that, during the upward and forward movement of the pocket 23 during the rotation of the wheel 1, any seeds released from the pocket in the manner hereinafter described, will gravitate into this hopper. A tube 28 extends from the discharge end of the hopper and partly around the container 11 to a boot 29 which is attached to one side of the wheel 1 and is designed to direct the discharged material into the furrow in which the wheel is traveling.

In the structure illustrated in the drawings the container 11 is provided with two seed dropping mechanisms which are duplicates, each of these mechanisms being provided with a hopper 27, a tube 28 and a boot 29.

Secured to the frame 4 at one side and extending over the shaft 2 is a cam 30 adapted, during the rotation of the wheel 1, to be engaged by the rollers 26, thus to press the arms 25 outwardly and cause the lever 22 and the pocket 23 to shift against the action of the springs 24.

As shown in the drawings another container 31 can be located at the other side of the wheel 1, and this container 31 in the present instance is shown divided by a partition 32 into two compartments 33 and 34 respectively. Each of these compartments is provided with one or more seed dropping mechanisms, the mechanisms of the two compartments being disposed side by side so as to discharge into hoppers 35 which rotate with the container 31 and are sufficiently wide to receive material discharged from the mechanisms of both compartments. Each hopper 35 opens into a tube 36 which, in turn, is designed to direct material into a boot as heretofore described. The mechanisms on the container 31 have laterally extending arms 37 similar to the arms 25 with the exception that each arm 37 is connected to a pair of seed dropping mechanisms. An operating cam 34 is connected to one side of the frame 4 and serves to shift the arms 37.

When it is desired to use the planter herein described, it is intended to place fertilizer in the container 11, place corn in the compartment 33 of container 31 and to place beans in the compartment 34 of container 31. When the machine is drawn forward the wheel 1 will of course rotate in the direction indicated by the arrow in Fig. 1 and this will cause the rear of each container to move upwardly and forwardly. During this movement portions of the contents of the containers will settle through the lowermost openings 13 and within the pockets 23 and as the pockets move upwardly above the contents of the containers, surplus material contained in the pockets will drop back through the openings 13 into the container. This will leave predetermined quantities in the pocket. As the containers continue to rotate the arms 25 and 37 will ride onto the cams 30 and 38 respectively and be pressed outwardly, thus to swing the pocket carrying levers outwardly away from the containers and cause the contents of the pockets to gravitate therefrom and into the hoppers 27 and 35. From these hoppers the material will be guided by the tubes to the boots and thereby directed into the furrow after which they will be covered by the plows or shovels 9. As soon as the arms 25 and 37 have passed out of engagement with the cams, the springs 24 will return the levers 22 and the pockets 23 to their normal positions so that when they are again moved downwardly below the level of the contents of the containers, portions of the contents will again gravitate into and fill the pockets. By adjusting the wings 17 toward or from the openings 13, the pockets 23 will be correspondingly shifted and it is thus possible to readily regulate the amount of material which will be retained by each pocket when it is brought to discharging position.

Although two dropping mechanisms have been shown combined with the container 11 and two with each of the compartments of the container 31 it is to be understood that this number may be increased or reduced as preferred.

The dropping mechanism is very simple in construction, is at all times readily accessible and will accurately measure a predetermined quantity of material. The entire machine is made very light and is easily guided and controlled.

What is claimed is:—

1. The combination with a revoluble container, of means revoluble with said container for collecting and elevating portions of the contents of the container, means for automatically discharging the contents of said elevating means when brought to a predetermined elevation, and means revoluble with the container for receiving the discharged contents and depositing them on the ground.

2. The combination with a revoluble container, of means outside of and revoluble with the container for receiving and elevating a portion of the contents of the container, means for automatically shifting said elevating means relative to the container to discharge the contents of said elevating means when brought to a predetermined elevation, and means revoluble with the container for receiving the discharged contents and directing them to the ground.

3. The combination with a revoluble container having an outlet opening in its periphery, of a pocket movably mounted on the container for receiving material through said opening and conveying it upwardly, means for automatically opening the pocket when raised to a predetermined position, and means revoluble with the container for receiving material discharged from the open pocket and directing it to the ground.

4. The combination with a revoluble container having a peripheral outlet opening, of a pocket movably connected to the container and normally closing said opening, said pocket being adjustable relative to the opening to vary the capacity of the pocket, means for automatically opening the pocket when raised to a predetermined position, and means for receiving material released from the open pocket and directing it to the ground.

5. The combination with a revoluble container having a peripheral outlet opening, of a normally closed pocket extending across and adapted to receive material from the outlet opening, means for automatically opening the pocket, and means revoluble with the container and extending close to the pocket for receiving material discharged from the open pocket and directing it to the ground.

6. The combination with a wheel, of a container revoluble with the wheel, said container having a peripheral outlet opening, a normally closed pocket extending across and adapted to receive material from the outlet opening, means for automatically opening the pocket, and means revoluble with the container and extending close to the pocket for receiving material discharged from the open pocket and directing it to the ground, said means including a hopper mounted on the container close to the pocket, a boot mounted upon one side of the wheel, and a tube connecting the hopper with the boot.

In testimony that I claim the foregoing as my own, I have hereto affixed my signature in the presence of two witnesses.

McKINLEY JENNINGS.

Witnesses:
   LAWRENCE E. LINDSAY,
   J. C. WILCOX.